(12) United States Patent
Hudson et al.

(10) Patent No.: US 6,261,624 B1
(45) Date of Patent: Jul. 17, 2001

(54) THERMAL AND PH STABLE PROTEIN THICKENING AGENT AND METHOD OF MAKING THE SAME

(75) Inventors: Heather M. Hudson, Raleigh; Christopher R. Daubert, Apex; Edward A. Foegeding, Raleigh, all of NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/353,741

(22) Filed: Jul. 14, 1999

(51) Int. Cl.[7] .................. A23C 21/00; A23L 1/0562
(52) U.S. Cl. .................. 426/573; 426/41; 530/365
(58) Field of Search .................. 426/573, 41, 42, 426/564, 565, 583; 435/68.1; 530/365

(56) References Cited

U.S. PATENT DOCUMENTS

| | | | |
|---|---|---|---|
| 3,930,039 | 12/1975 | Kuipers | 426/271 |
| 3,970,520 | 7/1976 | Feldman et al. | 195/29 |
| 4,036,999 | 7/1977 | Grindstaff | 426/549 |
| 4,088,791 | 5/1978 | Jones | 426/99 |
| 4,251,562 | 2/1981 | LeGrand et al. | 426/573 |
| 4,444,793 | 4/1984 | Schwartz et al. | 426/41 |
| 4,460,615 | 7/1984 | Furukawa et al. | 426/657 |
| 4,636,388 | 1/1987 | Lin et al. | 426/7 |
| 4,847,096 | 7/1989 | Mellqvist et al. | 426/41 |
| 4,855,156 | 8/1989 | Singer et al. | 426/565 |
| 4,985,270 | 1/1991 | Singer et al. | 426/515 |
| 5,039,532 | 8/1991 | Jost et al. | 426/41 |
| 5,147,677 | 9/1992 | Ziegler | 426/614 |
| 5,217,741 | 6/1993 | Kawachi et al. | 426/573 |
| 5,232,729 | 8/1993 | Katsuta et al. | 426/573 |
| 5,350,590 | 9/1994 | McCarthy et al. | 426/549 |
| 5,413,804 | 5/1995 | Rhodes | 426/583 |
| 5,416,196 * | 5/1995 | Kitabatake et al. | 530/366 |
| 5,494,696 | 2/1996 | Holst et al. | 426/583 |
| 5,503,864 | 4/1996 | Uchida et al. | 426/583 |
| 5,589,357 | 12/1996 | Martinez et al. | 435/68.1 |
| 5,643,622 | 7/1997 | Sawhill | 426/41 |
| 5,656,309 | 8/1997 | Sawhill | 426/41 |
| 5,744,179 | 4/1998 | Shimamura et al. | 426/41 |
| 5,750,183 | 5/1998 | Yamamoto et al. | 426/656 |
| 5,882,705 | 3/1999 | Sato et al. | 426/41 |

OTHER PUBLICATIONS

Ju et al., "Gelation of hydrolysates of a whey protein . . . ", International Dairy Journal (abstract only), 8(4): 303–309, Apr. 1998.*
Elofsson et al., "Characterization of a cold–setting whey protein . . . ", International Dairy Journal, 7(8–9):601–608, 1997.*
Ju et al., "Effects of limited proteolysis on Gelation . . . ", J. Dairy Sci., 78(10): 2119–2128, 1995.*
Otte et al., J. Dairy Sci., 79(5): 782–790, 1996.*
Fennema, O., Food Chemistry, Marcel–Dekker, Inc. Pub., 3rd. Ed., p. 204, 1996.*
Pelletier, C., "A Comparison of Consistency and Taste of Five Commercial Thickeners," *Dysphagia*, 1997, 12:74–78.
Bryant et al., "Molecular basis of protein functionality with special consideration of cold–set gels derived from heat–denatured whey," *Trends in Food Science & Technology*, 1998, 9, 143–151.

* cited by examiner

*Primary Examiner*—Keith Hendricks
(74) *Attorney, Agent, or Firm*—Myers Bigel Sibley & Sajovec

(57) ABSTRACT

A dry protein product useful as a thickening agent and fat substitute is provided. The powder can be readily reconstituted at room temperature, or refrigerated conditions, and can be used in frozen or refrigerated foods, at room temperature, and in cooking applications. When reconstituted the product preferably has a creamy, non-gritty texture, although texture and consistency of the product can be adjusted depending upon the desired application. The dry powder of the invention may be prepared by hydrolyzing a protein preparation (typically, a whey protein preparation) to produce a hydrolyzed whey protein preparation; then gelling the hydrolyzed whey protein preparation to form a whey protein gel; then drying the whey protein gel; and powdering the whey protein gel. Food products containing the powder in hydrated form, including both frozen dessert products, beverages and cooked products, are also disclosed.

44 Claims, 10 Drawing Sheets

THERMAL AND PH STABLE PROTEIN THICKENING AGENT AND METHOD OF MAKING THE SAME

FIELD OF THE INVENTION

The present invention is concerned with protein products, particularly whey protein products, that can be used as fat substitutes, thickening agents, water binders and the like, and methods of making the same.

BACKGROUND OF THE INVENTION

Patients who have difficulty swallowing (dysphagia) resulting from nerve or structural damage to the upper digestive tract have difficulty safely consuming liquids. Accordingly, such patients typically use commercially available thickening agents to safely consume nutritionally adequate amounts of foods and liquids. See generally C. Pelletier, *Dysphagia* 12, 74–78 (1997).

Pregelatinized starch, also known as cold-water-soluble starch, is available as a thickening agent (see, e.g., BeMiller and Whistler, Ch. 4 in *Food Chemistry*, pg 204, (O. Fennema Ed. 3d ed. 1996). Such materials are conveniently provided in dry powder form and can be readily reconstituted in a variety of foods and beverages to increase the viscosity thereof. However, such materials do not serve as a source of protein, and obviously serve as an additional source of carbohydrate. For dysphagia patients, where food consumption is difficult, it is desirable to find ways to allow the patients to increase protein consumption, and/or decrease carbohydrate consumption. Accordingly, there is a need for a dry protein product that can be used as a viscosity modifying agent.

Dry protein products that can be used as a thickening agent are not simple to produce. To be useful as a thickening agent the product must be conveniently mixed in a variety of foods, at a variety of pH, temperature, and other conditions. Such a product would be a "cold-set" protein gel, but the production of cold set protein gels has been difficult. C. Bryant and D. Elements (*Trends in Food Science and Technology* 9, 143 (1998)), describe progress towards cold-setting whey protein ingredients, but do not describe a dry powder that can be used to produce a cold-set protein gel.

In the neutraceutical and food industries, there has been considerable interest in the development of fat substitutes. Protein-based fat substitutes such as SIMPLESSE® are attractive from a nutritional perspective, and protein-based fat substitutes derived from a dairy product such as whey protein are particularly attractive. Thickening agents would possess many of the features desired in a fat substitute. However, some products that have been developed as fat substitutes to date lack thermal stability and are difficult to use in baked products, or have not been provided in dry powder form. A variety of such products are reviewed in G. Ziegler, U.S. Pat. No. 5,147,677 (See also N. Singer, U.S. Pat. No. 4,855,156). Accordingly, there is a need for a dry powder protein product that can be used in a variety of food applications.

SUMMARY OF THE INVENTION

Disclosed herein is a dry protein product useful as a thickening agent (e.g., for making cold-set protein gels) and fat substitute. The powder can be readily reconstituted at room temperature, or refrigerated conditions, and can be used in frozen, refrigerated, room temperature, or cooked foods. When reconstituted the product preferably has a creamy, non-gritty texture, although texture and consistency of the product can be adjusted depending upon the desired application.

The dry powder of the invention may be produced by hydrolyzing a protein preparation (preferably a solution) (typically, a whey protein preparation) to produce a hydrolyzed whey protein preparation; then gelling the hydrolyzed whey protein preparation to form a whey protein gel; then drying the whey protein gel; and powdering the whey protein gel.

Also disclosed are formulated edible food products for human consumption that normally contain fat in a sufficient concentration to make an organoleptic contribution to the food product; wherein at l-east a portion of the fat in said food products is replaced with a rehydrated dry protein powder, with said dry protein powder being as described above. Methods of making the same are also disclosed.

Food products containing a rehydrated dry protein product of the invention as a thickening agent, and methods of making the same, are also disclosed.

Food products containing a rehydrated dry protein product of the invention as a water binder, and methods of making the same, are also disclosed.

The foregoing and other objects and aspects of the present invention are explained in detail in the drawings herein and the specification set forth below.

DETAILED DESCRIPTION OF PREFERRED EMBODIMENTS

Figure 1A:
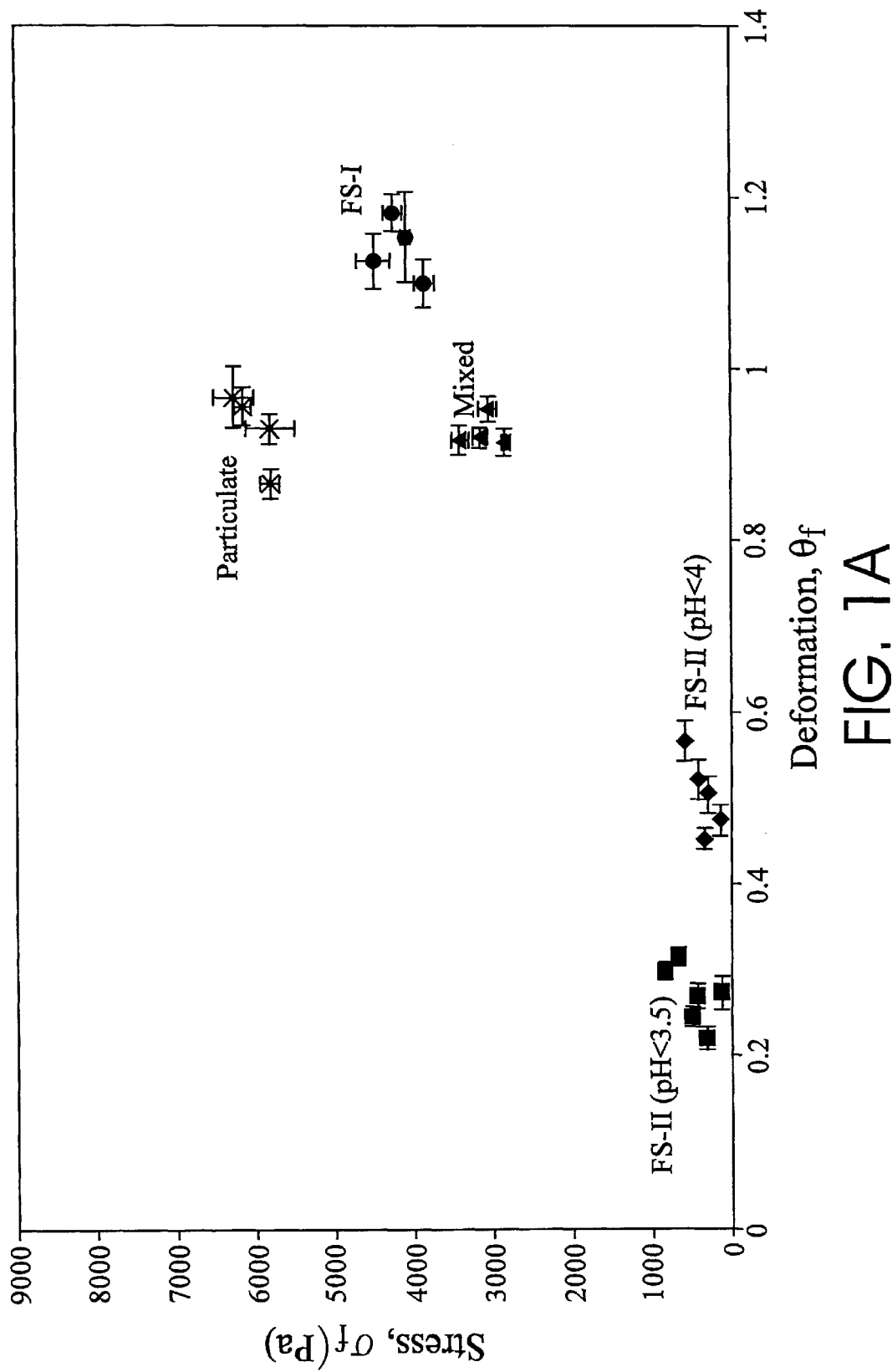
FIG. 1*a* shows gel type classification for 45 minute gels using vane fracture.

Whey protein is widely available as a by-product of the cheese manufacturing industry. Any whey protein can be used to carry out the present invention, including but not limited to dried whey powder or concentrated (i.e., liquid) whey preparations. Numerous techniques for manufacturing whey protein are known, including but not limited to those described in U.S. Pat. No. 4,036,999 to Grindstaff and U.S. Pat. No. 3,930,039 to Kuipers. (the disclosures of all U.S. patent references cited herein are to be incorporated herein by reference in their entirety). Currently preferred is a commercial whey protein isolate containing approximately 91 percent (w/w) protein, available as BIPRO™ from Divisco International Inc. (LeSueur, Minn. USA.).

While whey protein is preferred for practicing the present invention, other sources of protein can also be used, particularly soy protein and egg albumin (including fresh, refrigerated, frozen or dried egg white).

The protein may be hydrated for hydrolysis as necessary by combining it with water, typically by adding it to water at room temperature with stirring. The amount of protein in the hydrated protein preparation is not critical. For example, preparations of from about 1, 2 or 5 to 15 or 20 percent (weight/weight) of protein may be used. Additional ingredients such as salts may be included in the preparation if desired. The preparation may be a solution, dispersion, microemulsion, emulsion or the like, but solutions are preferre.

After hydration, hydrolysis of the protein may be carried out by any suitable means, including acid hydrolysis and enzyme hydrolysis. Acid hydrolysis is currently preferred.

For acid hydrolysis, a suitable acid can be added to the hydrated protein preparation to adjust the pH thereof to an acid pH, typically a pH of about 1, 2 or 3 to about 4, 5 or 6, and the hydrated protein preparation held for a time and at a temperature sufficient to achieve the desired degree of hydrolysis. Suitable acids for acid hydrolysis include, but are not limited to, hydrochloric acid, sulfuric acid, citric acid, acetic acid, phosphoric acid, polyphosphoric acid, and phytic acid, as well as organic acids such as, for example, oxalic acid, succinic acid, maleic acid, fumaric acid, lactic acid, and others.

For enzyme hydrolysis a suitable enzyme or enzyme system can be added to the hydrated protein preparation, and the preparation then held for a time and at a temperature (and at a pH) sufficient to achieve or produce the desired degree of hydrolysis. Enzymes or enzyme systems suitable for hydrolyzing proteins such as whey are known, and are typically proteases or combinations thereof. Examples are given in U.S. Pat. No. 4,847,096 to Mellqvist et al., U.S. Pat. No. 5,589,357 to Martinez et al., and U.S. Pat. No. 3,970,520 to Feldman et al.

Hydrolysis, whether by acid hydrolysis or enzyme hydrolysis, should be carried out in a manner that provides the desired degree of hydrolysis. In general, the degree of hydrolysis will be sufficient to achieve the desired type of gel in the gelling or gelation step discussed below. Typically, "degree of hydrolysis" is defined as the amount, in percentage, of peptide bonds that have been cleaved during the hydrolysis step (See U.S. Pat. No. 4,847,096 to Mellqvist et al. at column 2 lines 30–36). The degree of hydrolysis will be sufficient to achieve the desired gel as noted below, with degrees of hydrolysis of 0.5, 1 or 2 up to 4 or 5 being representative.

Gelation can be carried out in accordance with known techniques. See, e.g., U.S. Pat. No. 4,251,562 to LeGrand et al.; U.S. Pat. No. 4,636,388 to Lin et al., and U.S. Pat. No. 5,217,741 to Kawachi et al. Thermal gelation of proteins such as whey protein is a two-stage process, involving an initial unfolding and subsequent aggregation of protein molecules (M. Verheul et al., *Langmuir* 14, 2263 (1998); J. DeWit et al., *Journal of Dairy Science* 67, 2701 (1984)). When native proteins are heated above 65–70° C., they partially unfold as physical forces favoring unfolding, mainly configurational entropy, increase above those forces favoring folding, hydrophobic interactions (C. Bryant et al., *Trends in Food Science & Technology* 9, 143 (1998)). Once the whey proteins have been heated to unfolding temperatures, they may either aggregate or remain unfolded as individual molecules, depending on the balance of attractive and repulsive interactions. In general, changes in the gelation environment may alter protein-protein and protein-solvent interactions by shifting the balance of attractive and repulsive forces (predominantly, electrostatic and hydrophobic interactions and hydrogen bonding). This shift consequently affects the rates of unfolding and aggregation, resulting in different gel structures (Q. Tang et al., *Journal of Dairy Research* 62, 469 (1995)). Protein unfolding and aggregation are particularly sensitive to pH and ionic strength due to the dependence on electrostatic interactions.

The networks formed in WPI gelation contributes to the texture, water holding and appearance of the gel. Gels are grouped as particulate, fine-stranded (FS) or mixed networks. The type of gel matrix formed is determined by pH, solutes and gelation kinetics. Protein molecules are charged at pH values significantly higher or lower than their isoelectric points (pI) and an appreciable electrostatic repulsion opposing intermolecular protein-protein interactions is present (E. Foegeding et al., in *functional Properties of Proteins and Lipids*, pp145–157 (J. Witaker et al. Eds. 1998)). At low salt concentrations the electrostatic repulsion can be so significant that protein-protein interactions are limited and gelation is prevented (D. McClements et al., *Journal of Texture Studies* 24, 411 (1993)). As the salt concentration is increased (<0.1M) the charges are partially shielded and a transparent filament gel is formed (E. Doi, *Trends in Food Science & Technology* 4, 1–5 (1993)). Gels produced under these conditions contain a fine-stranded microstructure and translucent appearance (D. McClements et al., *Journal of the Science of Food and Agriculture* 69, 7 (1995)). At neutral pH and salt concentrations high enough to completely shield electrostatic repulsion (>0.1 M), attractive forces dominate and protein aggregation may be so extensive that protein molecules form large particles, typically a few $\mu$m in diameter (P. Kuhn et al., *Journal of Food Science* 56, 789 (1991)). The resulting turbid, particulate gels have an opaque milky-white appearance due to large aggregates scattering light. Mixed gels, the final subset, possess physical and functional properties of both fine-stranded and particulate, and are produced with intermediate salt concentrations (E. Foegeding et al., supra (1998)). The condensing of linear strands into larger aggregates is thought to be the causal mechanism for mixed gel formation.

The textures of each gel type can be characterized by rheological properties, fracture stress and deformation, and physically with appearance and water-holding analyses (Table 1). Holding protein concentration and processing temperature constant, the value of these parameters will vary according to the processing conditions such as heatint time and solution conditions, including pH and salt. For example, while fine-stranded gels formed above or below the pI have a similar translucent appearance, stranded gels formed above the pI (FS-I) are strong and eleastic whereas those formed below the pI (FS-II) have a weak, brittle structure (E. Foegeding et al., supra (1998)). Therefore, while FS-I gels and FS-II gels possess the same appearance, their rheological properties are different due to varying amounts of intramolecular interactions at reduced pH. In addition, WPI gels with well cross-linked, fine-stranded (FS-I) microstructures hold water better than gels with particular microstructures (E. Bowland et al., *Food Hydrocolloids* 9, 47 (1995)). The increasing salt concentrations found in particulate gels result in an increase to the effective pore size of the matrix, consequently water-holding capacities of the gels decrease as salt concentrations incrreease. Mixed gels have intermediate water holding properties with large fracture stresses and low deformability.

In carrying out the present invention, gelling carried out at a pH of 4 or less are preferred, which conditions cause the formation of a weak gel structure (i.e., a gel structure characterized by fewer protein networks, with those networks formed being fine-stranded networks, and which gel fractures below 10, and more preferably below 5, KPa (kiloPascals) in a vane fracture test). Gelling conditions that favor or cause the formation of FS-II gels are particularly preferred.

After gelling, the gelled protein preparation is dried. Drying can be carried out by any suitable technique, including but not limited to freeze-drying, dehydrating, and spray drying. Spray drying may be used to concurrently carry out the powdering step, as noted above. Freeze drying is currently preferred.

The dried protein preparation is powdered as necessary by crumbling, grinding or the like to the desired particle size. A powder with an average particle size of from 1 or 2 $\mu$m up to 50 or 100 $\mu$m is preferred. In a current embodiment, the average particle size is about 25 $\mu$m. Powdering may be achieved concurrently with drying when spray-drying is employed, as noted above, or further grinding or powdering by mechanical means may be employed.

Once powdered, the present invention provides a dry protein product useful as a thickening agent, fat substitute, water binding agent or the like. The product comprises a dry powder produced by hydrolyzing, gelling, drying and powdering a whey protein, as explained above. The powder is characterized by a viscosity of at least one-half or one pascal second at 46 reciprocal seconds for one half hour in a steady state shear test at 25° C. when reconstituted as a 10% weight/weight solution in deionized water at a pH of 4 or when adjusted to a pH of 8 as well. The powder is preferably characterized by such viscosity when the same tests are conducted at 5° C. (for powders to be used in frozen products); the powder is preferably characterized by such viscosity when the same tests are conducted at 50° C. or even 75° C. (for products that are cooked, or to be cooked).

The powder is further characterized by a phase angle of five to forty degrees (and preferably less than 20 degrees) at frequencies of from 0.01 to 20 Hertz in a frequency sweep test at 25° C. when reconstituted as a 10% weight/weight solution in deionized water.

The powder is further characterized by a solubility of at least 50%, and more preferably at least 70%, at 25° C. when reconstitituted as a 1% weight/weight solution in deionized water at a pH of 7. Percent solubility is determined by centrifuging the said solution at 20,000× gravity for 15 minutes and measuring absorbance at 280 nanometers on a sample aliquot diluted 1:10 volume/volume in dissociating buffer (50 mM EDTA, 8 M urea at pH 10). Solubility is obtained from the absorbance ratio of the supernatant to that of the dispersion before centrifugation (Britten et al., *Journal of Dairy Science* 77, 676 (1994)). 50% or 70% soluble refers to samples having over 50% or 70% suspended particles, respectively (as compared to the native protein isolate from which the powder is prepared) after centrifugation at pH 7.0.

The dry powder described above can be combined with other ingredients, such as emulsifying agents stabilizing agents, anti-caking, anti-sticking agents and the like. Representative stabilizing agents are gums, which include naturally occurring plant polysaccharides such as obtained from trees, seeds, seaweed and microbes, including gum arabic, acacia, tragacanth, karaya, larch, ghatti, locust, guar, agar, algin, carrageenan, furacellaran, xanthan, pectin, certain proteins such as gelatins, plus certain chemical derivatives of cellulose.

The dry powder can be combined with a cold-water-soluble starch or "pregelatinized starch" to provide a thickening agent or fat substitute with both protein and carbohydrate components, depending upon particular dietary and cost considerations. (BeMiller and Whistler, supra pg 204). Pregelatinized corn starch is preferred. A pregelatinized starch can be included in the dry powder in any suitable amount such as from 1 or 2 percent to 80 or 90 percent by weight to provide a combination protein and carbohydrate-based thickening agent or fat substitute.

The dry powder can be packaged in screw-top or sealed polymeric containers for consumer use in accordance with known techniques, or can be rehydrated in an aqueous liquid and provided as a liquid concentrate to consumers or other end users. The dry powder can be used as a thickening agent for dysphagia patients or for people who simply desire a protein-based alternative to the usual starch-based thickening agents. In addition to use as a thickening agent, the dry powder can be used as a fat substitute, as a water binder, or as combinations thereof, as discussed below.

In use as a fat substitute, the dry powder can be combined with a food product in the same manner as the egg white product described in U.S. Pat. No. 5,147,677 to Ziegler to produce a formulated edible food product for human consumption normally containing fat in a sufficient concentration to make an organoleptic contribution to said food product (typically from 1 or 2 percent by weight to 50 or 60 percent by weight); wherein at least a portion of the fat (e.g., 1, 2 or 5 percent by weight to 20, 50 or 100 percent by weight of the total fat) in the food product is replaced with a hydrated protein powder of the present invention. Because water is present in the food product (either through the addition of water or its presence in ingredients such as eggs or milk), the dry protein powder is rehydrated in the food product. Of course, the dry powder can be rehydrated prior to or during its combination with some or all of the other ingredients of the food product. Mixing of the ingredients can be carried out in any suitable manner, such as with a blender, stirring, shaking or the like, to uniformly mix or disperse the rehydrated dry powder through the food product (or, in the case of a combination product such as a pie and filling, to uniformly mix the rehydrated dry powder through that portion of the product in which it is contained).

When used as a thickening agent, the powder is combined with the other ingredients of the food product in an amount sufficient to thicken or increase the viscosity of the food product (typically 1 or 2 percent to 50 or 60 percent by weight of the total weight of the product), in like manner and as described for the fat substitute food products noted above.

When the powder is used as a water binder, the powder is combined with the other ingredients of the food product in an amount (typically 1 or 2 percent to 50 or 60 percent by weight of the total weight of the product) sufficient to increase the amount of water retained in or bound in the food product, in like manner as described for the fat substitute food products above.

The powder of the invention may of course serve multiple functions in a single food, as a fat substitute, binder, and/or thickening agent, to facilitate foaming, etc., and identification of one flnction herein is not intended to exclude that the ingredient is performing other flnctions.

The typical solid food product will constitute from 1 or 2 percent to 50, 60, or 70 percent by weight water (from all sources), or more. The typical liquid (including thickened liquid) food product will typically constitute 40 or 50 percent to 90, 95 or even 99 percent by weight water (from all sources). Other ingredients of a solid food product will typically constitute from 10 or 20 percent to 50, 60 or 70 percent by weight. Other ingredients of a liquid (including thickened liquid) food product will typically constitute from 1 or 2 percent up to 40 or 50 percent by weight, and occasionally more. These percentages are provided as general guidelines only; sometimes water is included in the weight of "dry" ingedients which are not fully dehydrated, and of course in no case do the total amounts of all ingredients exceed 100 percent, thus, it is preferred to define food products of the invention simply by reference to the amount by weight of the dry powder protein preparation added thereto.

Specific examples of food products that can be prepared with the dry powder protein preparation described herein include dessert products or dairy products such as ice cream, custard or the like; cooked products or flour-based products such as bread, cookies, brownies, cheese cake, pie, other snack foods and the like; beverages such as a milk shake or other shake, fruit juices and the like; a health supplement, nutritional supplement, or medical food product such as a beverage or bar; sauces, dips, spreads, icings and cream pie fillings and the like, in the same manner as the fat substitutes described in U.S. Pat. No. 5,413,804 to Rhodes, U.S. Pat. No. 4,985,270 to Singer et al., and U.S. Pat. No. 4,855,156 to Singer et al.

To manufacture such food products, the dry powder described above can be combined, typically by mixing, with one or more other ingredients, such as various combinations of flour, sugar, eggs, oil, milk, water, cheese, meat, nuts, fruit, salt, fat, water, fruit juice, vegetables, leavening agents, preservatives, etc., depending upon the particular formulated food product being prepared. The dry powder of the invention may be rehydrated before or during the combining step by adding an aqueous ingredient such as water or milk (thus, the various ingredients may be combined in any suitable order). The product can then be frozen, refrigerated, or cooked, depending upon the particular type of product, and stored for further use. Cooking can be carried out by any suitable thermal process at any suitable temperature, typically from 25° C. to 90 or 110° C. (preferably less than 100° C.), for up to one-half hour or one hour or more, depending upon the particular product being prepared. Thus, some products can be prepared in the home by the consumer, and other products can be prepared in a commercial manufacturing plant for repackaging and reselling as a finished food product, or as a further ingredient for restaurant or institutional use or the like.

Products prepared with the powder of the present invention can be foamed by subjecting them to shear forces to introduce air pockets or bubbles throughout the product, by whipping, beating, extruding or the like, in accordance with known techniques. The dry powder of the present invention can be prepared to impart excellent foaming properties to the food product in which it is incorporated and used to create a long shelf-life (e.g., up to 4 or 5 months or more) foamed product.

The present invention is explained in greater detail in the following non-limiting Examples.

EXAMPLES

Physical and Rheological Properties of Derivitized Whey Protein Isolate Capable of Forming Cold-Set Gels 1. Materials and Methods.

All materials used for this research were food grade. A commercial whey protein isolate (WPI) powder (lot # JE057-7-420), containing approximately 91.2% (w/w) protein (N×6.38, micro-Kjeldahl, AOAC 1984) was used for the experiments (Bipro, produced by Divisco International Inc. Le Sueur, Minn.). All chemicals, NaCl, $CaCl_2$, NaOH, and HCL were purchased from Fisher Scientific Company (Fair Lawn, N.J.).

Preparation of Protein Dispersions and Gels.

WPI powder was hydrated (12% w/w) in 0–50 mM NaCl and/or 0–20 mM $CaCl_2$ solutions made with double-distilled water for 1 hour by slow stirring, degassed under vacuum for 1 hour to remove visible air bubbles, and brought to volume with double-distilled water. The pH for FS-II gel protein dispersions was adjusted to 4.0 or 3.5 with 6 N HCl or 6 N NaOH. WPI gels were produced by heating the dispersions in aluminum freeze-drier pans (13.5 cm×13.5 cm) at 80° C. for 45 minutes or 3 hours according to the procedure in Foegeding (Journal of Texture Studies 23, 337 (1992)).

Gel Type Determination.

Vane fracture tests and water holding trials were conducted to determine gel type: particulate, mixed, FS-I, or FS-II.

Vane Analysis.

The vanes consisted of four identical stainless steel blades (23 gage) fixed to a center shaft. Two vanes with similar heights (H) of 20 mm and varying diameters (D) of 10 and 8 mm were inserted flush with the gel sample in aluminum pans and rotated with a Haake VT550 viscometer (Paramus, N.J.) at a speed of 0.5 rpm until fracture. Tests were performed nine times for each gel, and peak torque ($M_f$) and time at fracture ($t_f$) were recorded. Stress ($\sigma_f$) and vane rotation at fracture ($\theta_f$) ( strain) were calculated according to Daubert et al. (*Journal of Texture Studies* 29, 427 (1998)).

$$\sigma_f = \frac{2M_f}{\pi D^3}\left(\frac{H}{D} + \frac{1}{6}\right)^{-1} \qquad \text{Eq. 1}$$

$$\theta_f = t_f\left(\frac{\pi\,(\text{rad})}{60\,(\text{s})}\right) \qquad \text{Eq. 2}$$

Gel Powder Production.

After thermal gelation, gels were held at 25° C. until internal temperature was less than 40° C. Gels were then placed in a freezer for 16–18 hours at −5° C. Frozen gels were dried in a 10-145-MR-TR Mechanically Refrigerated Freeze-Mobile freeze dryer with tray drying chamber (Virtis Research Equipment, Gardiner, N.Y. USA). Shelf temperature was held between 26.7–37.8° C. with the 10-701 Control unit (Virtis Research Equipment, Gardiner, N.Y.) with thermocouple inserted into the center of the gel. Gels were dried until moisture content was below 5%, as determined by a Computrac Max-50 Moisture Analyzer (Arizona Instrument Corp. Tempe, Ariz. USA). Dried gels were crushed by hand, stored in airtight bags for 18 hours, and ground using a ZM-1 Brinkman Centrifugal Grinding Mill with a 24-tooth stainless-steel rotor (Brinkman Instruments Co., Westbury, New York USA) at 10,000 rpm for 60 seconds and a screen size of 50 mm. Average particle size of ground protein powder was 27.3 μm as determined by a Centrifugal Particle Size Analyzer SA-CP4 (V1.0) (Shimadzu Corporation, Kyoto, Japan). Finally, protein gel powders were stored at 25° C. in airtight bags.

Solubility Determination.

Milled protein powders were dispersed (1% w/w) in deionized water and the pH adjusted with either 6N NaOH or 6N HCl to 7.0. Dispersions were centrifuged at 20,000×g for 15 min and solubility was obtained from the absorbance ratio of the supernatent and the dispersion before centrifugation. Absorbance was measured at 280 nm on a sample aliquot diluted 1:10 (vol/vol) in dissociating buffer (50 mM EDTA, 8 M urea at pH 10) (Britten et. al., *Journal of Dairy Science* 77, 676 (1994)). The term "soluble" was used to define samples having over 70% suspended particles after centrifugation at pH 7.0.

Differential Scanning Calorimetry.

A Perkin Elmer DSC 7 (The Perkin Elmer Corporation, Norwalk, Connecticut USA) differential scanning calorimeter was used to assess the thermal denaturation of the gel powders for each processing condition. The DSC was calibrated and allowed to equilibrate for one hour prior to analysis. Dried protein powder was hydrated (10% w/w) and 20 $\mu$L was loaded into an aluminum capsule and hermetically sealed. A similarly weighted, aluminum pan was filled with deionized-water and used as the reference. The scanning temperature was raised from 5 to 110° C. at a rate of 5° C./min. Temperature at peak height and peak area was recorded.

Electrophoresis.

The soluble protein samples were analyzed for hydrolysis by SDS-PAGE (sodium dodecylsulfate-polyacrylamide gel electrophoresis) with a Novex Midget electrophoresis unit (Novex, Novel Experimental Technology, San Diego, Calif. USA). All procedures were followed according to the NuPAGE gel procedure for a Bis-Tris (MES) gel. A 30 $\mu$l aliquot of 0.1% protein was injected into each well of the 10 welled, 4–12% gradient polyacrylamide gel (Novex, Novel Experimental Technology, San Diego, Calif.). The gel was stained with a 0. 1% Coomassie Blue solution (45% water, 45% methanol, 10% acetic acid) (Pierce Chemical Company, Rockford Ill. USA). A Molecular Dynamics personal densitometer (Molecular Dynamics, Sunnyvale, Calif. USA) was used to determine the major protein species hydrolyzed by the various processing conditions. In addition, the densitometer allowed quantification of the hydrolyzed protein bands and their molecular weight range based on the MultiMark multi-colored standard used (Novex, Novel Experimental Technology, San Diego, Calif.).

Rheological Analysis.

The protein powders were hydrated (10% w/w) and tested rheologically. Once solutions were placed in the measuring cup and the bob immersed in the sample, solutions were coated with a thin layer of paraffin oil from Fisher Scientific Company (Fair Lawn, N.J. USA) to prevent moisture loss.

Shear Rate Ramps.

Tests were conducted on a Bohin VOR Con trolled Strain Rheometer (Bohlin Reoligi AB, Lund, Sweden) using a concentric cylinder geometry (C14). Selected shear rates were ramped from 0.9 to 116.0 $s^{-1}$ and back to 0.9 $s^{-1}$ for 650 s. Fresh samples were sheared at temperatures of 25, 50 and 75 mC Temperature Ramps. Tests were conducted on a Bohlin VOR Controlled Strain Rheometer using a concentric cylinder geometry (C14). Temperatures were ramped from 5 to 90° C. and back to 5° C. at a shear rate of 46 $s^{-1}$ for 2220 s.

pH Stability.

Tests were conducted on a Bohlin VOR Controlled Strain Rheometer using a concentric cylinder geometry(C14). Stability was tested at pH 4.0 and 8.0 at 25° C. and shear rates were ramped from 0.9 to 116.0 $s^{-1}$ and back to 0.9 $s^{-1}$ for 650 s.

Frequency sweeps. Analysis was performed on a StressTech Controlled Stress Rheometer (ReoLogica Instruments AB, Lund, Sweden) using a concentric cylinder geometry (CC25). Stress was held at 1.0 Pa and frequency was oscillated from 0.1 to 20.0 Hz and alternated between 25 and 90° C. for 688 s. All tests were preformed within the identified linear viscoelastic region for the material at the temperatures tested.

2. Results and Discussion

Gel Procedure.

Whey protein solutions were gelled to denature and stabilize the derivitized powder. Gels were prepared according to Foegeding (Journal of Texture Studies 23, 337 (1992)), with the heating time extended from 30 to 45 minutes insuring adequate heat transfer in the aluminum freeze-drier pans. During preliminary rheological studies of the FS-II gels, the apparent viscosity of the protein powders in solution (10% w/w) sharply increased at 88° C. If held at that temperature longer than 5 minutes the solution would gel, indicating a substantial portion of the protein had not denatured or had undergone reversible denaturation. Therefore, a 3-hour gelation time was applied to all gel type solutions to promote more extensive protein denaturation and enhanced heat stability.

Gel Type Determination.

Vane fracture tests and water holding analyses were conducted to distinguish protein gels Theologically and structurally. The vane attachment was used to quantify the stress and deformation (strain) in order to place the whey protein gels in distinct categories for comparative and classification purposes. Water-holding analysis was used to qualify water-holding trends, related to compositional characteristics of the various gel types.

Vane.

Figure 1B:
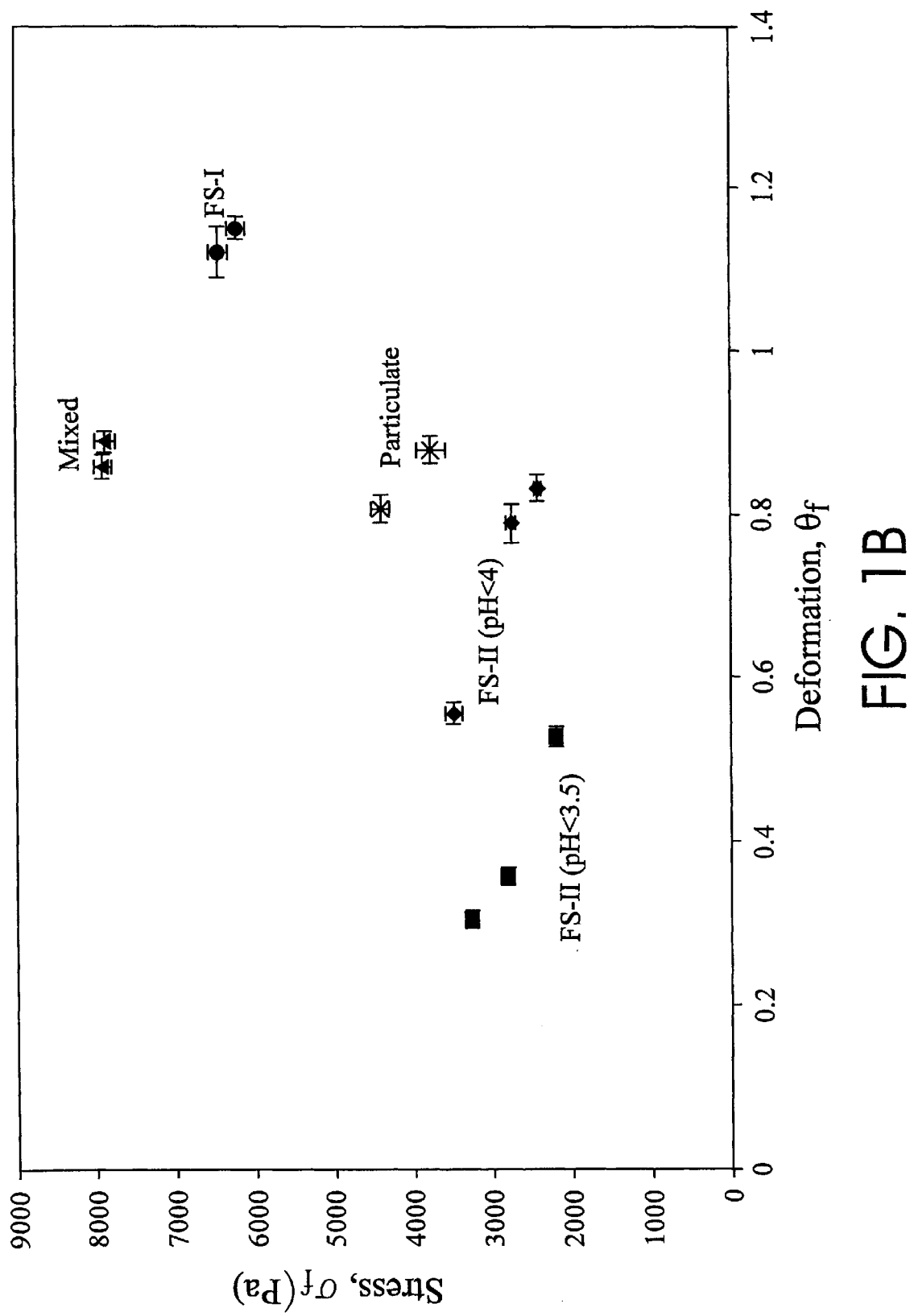
FIG. 1*b* shows gel type determination for 3 hour gels using vane fracture.
Figure 1C:
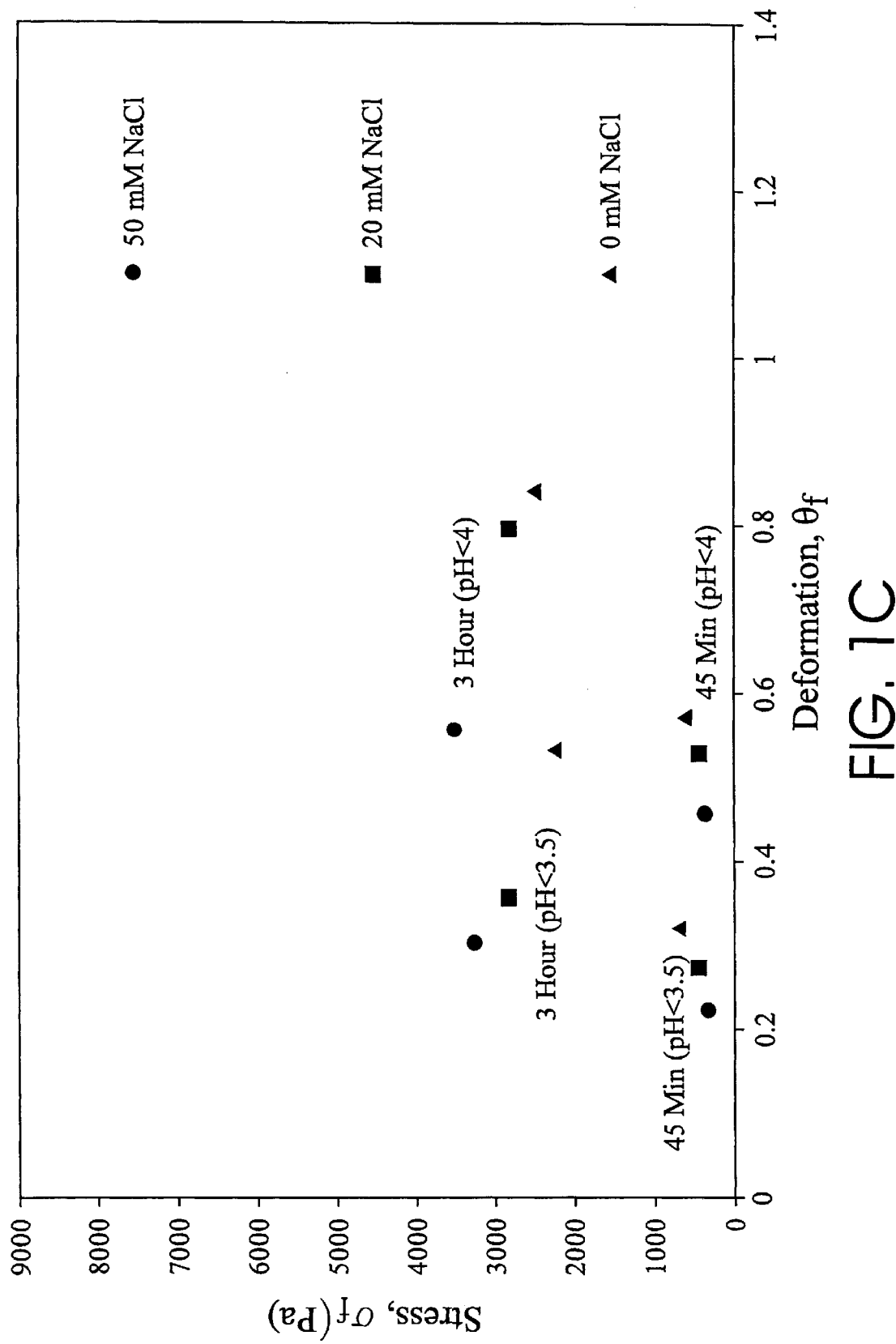
FIG. 1*c* shows gel type determination of 45 minute and 3 hour FS-II gels using vane fracture.

Vane attachments sheared gels to fracture, offering a simple approach for 10 gel classification. The peak fracture stress provided indication of gel strength, while vane rotation at fracture furnished an understanding of gel deformation characteristics. Vane experiments concluded that gelation time influenced stress at fracture values for all gel types ($p \leq 0.05$). When comparing treatments in FIG. 1$a$ and FIG. 1$b$, the lower fracture stresses for 45-minute gels may result from inadequate heating time and/or temperature (80° C.) to completely cure the gel structure. This effect may be due to an underestimation of the heat transfer effects of the aluminum gel pans or increased solution volume. The significance in the stress difference for the FS-II gels may also be attributed to enhanced thermal stability of whey protein solutions below pH 4.0, thereby requiring longer thermal treatments to denature the proteins and produce networks. This speculation is supported by Jelen et al. (*Milchwissenschaft* 38, 215 (1984)), who demonstrated that below pH 3.5 protein solutions resisted coagulation for an average of minutes at 80° C. In addition, Harwalkar (*Journal of Dairy Science* 63, 1052 (1980)) noted slower thermal denaturation rates of whey proteins at low pH than those reported at near neutral pH. Patocka et al. (*Milchwissenschaft* 42, 700 (1987)) found β-LG was virtually heat stable below pH 3.8–3.6. Therefore, little protein denaturation occurred at the 45-minute thermal treatment due to the stabilizing effect of low pH. An increase in heating time resulted in more denaturation and complexing between proteins, culminating in a higher fracture stress.

Although FS-I and FS-II gels had the same protein concentration and ionic strength, the fracture stress and deformation differences were significant. Errington et al. (*Journal of Agricultural and Food Chemistry* 46, 2963 (1998)) noted that gels formed below pH 4.0 were weak and brittle (FS-II gels), in contrast to the same formulation of salt and protein formed at pH>6.0 (FS-I gels). This decrease in deformability of the FS-II gels was the result of fewer intermolecular disulfide linkages due to minimal sulfhydryl oxidation and sulfhydryl-disulfide exchange at low pH. This hypothesis helps qualify the larger deformation noted in the <pH 4.0 FS-II sample verses the <pH 3.5 FS-II in FIGS. 1a and 1b; a lower solution pH resulted in fewer disulfide bonds and therefore, diminished deformability.

The stress difference between the FS-I and FS-II gels may be a result of acid hydrolysis of proteins at low pH. Britten et al. (*Journal of Dairy Science* 77, 676 (1994)) demonstrated that gels formed at pH 4.0 had fewer large aggregates formed with increasing hydrolysis. At that pH, peptides are believed to interfere with the formation of large aggregates, resulting in a large proportion of small aggregates. In addition, Langton et al. (*Journal of Food Hydrocolloids* 5, 523 (1992)) documented gels prepared at pH 3.5 have networks of short thin strands (~4 nm in diameter) with several strands intersecting at one junction, while gel networks formed at pH 7.0 and 6.5 were composed of longer strands of equal or greater thinckness than those formed at pH 3.5. These influences would change the intermolecular interactions and thereby alter the stress required to fracture the matrix, providing additional support for the lower fracture stresses recorded for the FS-II gels at both the <3.5 and <4.0 pH.

There were no obvious trends for various salt concentrations for stress and deformation at fracture in the mixed, particulate, or FS-I gels for either gelation time. However, in the FS-II gels (FIG. 1c), a pattern of increasing deformation and increasing stress with decreasing salt concentrations for the 45 minute gels at pH values of <4.0 and <3.5 was observed. In the 3-hour gels however, there was a shift in the pattern, increasing deformation and decreasing stress with decreasing salt concentrations at both pH values. This shift in salt trends from the 45 minute to the 3-hour gel time may be attributed to an increase in charge shielding over the longer incubation time. The solutions with higher salt concentrations have more time to orient themselves around the positively charged protein molecules, while decreasing the repulsion of like charges between protein species and permitting aggregation. Aggregation of proteins results in a more "particulate" type of FS-II gel structure, presented by gels with low deformability and higher fracture stress. This observation was supported by Harwalker et al. (1985) who found those protein solutions at low pH but high ionic strengths resulted in lower ionic forces but enhanced hydrophobic interactions, increasing coagulation and therefore, gelation.

Particle size.

Figure 2:
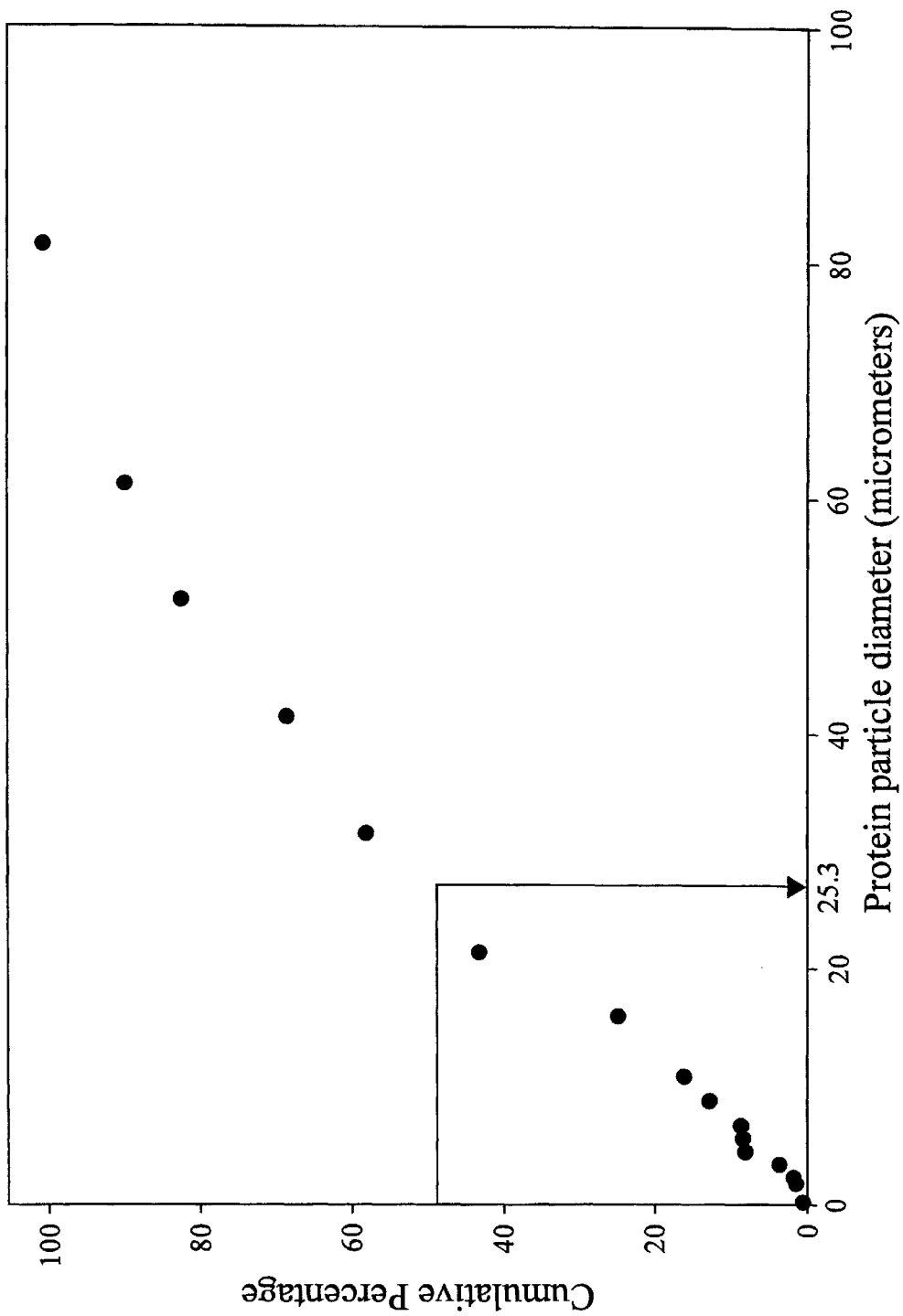
FIG. 2 shows particle size analysis of dried, ground, whey protein gels.

After thermal gelation and vane experimentation, gels were frozen, freeze-dried and ground. Particle size analysis was conducted on the resulting dry protein powders, and average particle size of 25.3 μm was determined (FIG. 2).

Solubility.

Solubility is an important characteristic for functional application of proteins in food systems, serving as a prerequisite for derived functional properties like emulsification, foaming, and gelation (de Wit, *Journal of Dairy Science* 73, 3602 (1990)). A solubility test therefore served as a means of elimination of gel powders based on suitability for further analyses and applicability to industrial use. Powders with low solubility could not be analyzed effectively by gel electrophoresis, DSC, or Theologically and were therefore excluded from further evaluation. Seven powders exhibiting solubility values of ≧70% at pH 7.0 were labeled for continued evaluation. Therefore, all subsequent discussion of experimental analysis was only conducted on the soluble gel powders. Table 1 gives the network types and physical properties of whey protein gels. Table 2 serves as sample identification key, detailing salt concentrations and solution pH and provides solubility values for all gel types.

TABLE 1

Network types and physical properties of whey protein gels

| Gel Type | Fracture Rheology | | Appearance | Water Holding |
|---|---|---|---|---|
| Stranded | Stress | Deformation | | |
| I) pH > pI | +++[a] | +++ | Translucent | +++ |
| II) pH < pI | + | + | Translucent | ? |
| Mixed | ++++ | ++ | Cloudy/opaque | ++ |
| Particulate | +++ | +++ | Opaque | + |

Adapted from Foegeding et al., in J. Witaker et al., Functional Properties of Proteins and Lipids, 145–157 (1998)(New York: American Chemical Society)
[a]The number of "+" symbols represents the relative magnitude of a property among gel types, with the greater number of symbols indicating a greater magnitude, and "?" indicating no relevant data.

TABLE 2

Dried WPI powder sample identification, thermal gel time, concentration of salts used in gelation, pH and solubility

| Sample ID | Gel Time | pH | mM NaCl | mM CaCl$_2$ | Gel Type | Solubility* |
|---|---|---|---|---|---|---|
| 7H | 45 min | 3.93 | 50 | 0 | FS-II | 61.4 |
| 7G | | 3.99 | 20 | 0 | (pH < 4) | 70.0 |
| 7I | | 3.98 | 0 | 0 | | 67.8 |
| 7K | 45 min | 3.45 | 50 | 0 | FS-II | 61.1 |
| 7J | | 3.40 | 20 | 0 | (pH < 3.5) | 71.2 |
| 7L | | 3.40 | 0 | 0 | | 70.3 |
| 7F | 45 min | 6.77 | 50 | 0 | FS-I | 6.7 |
| 7E | | 6.77 | 20 | 0 | | 8.0 |
| 7D | 45 min | 6.77 | 25 | 5 | Mixed | 6.0 |
| 7C | | 6.77 | 20 | 5 | | 23.3 |
| 7B | 45 min | 6.77 | 40 | 5 | Particu- | 14.6 |
| 7A | | 6.77 | 30 | 10 | late | 6.4 |
| 1 | 3 hours | 3.88 | 50 | 0 | FS-II | 68.8 |
| 2 | | 3.94 | 20 | 0 | (pH < 4) | 68.8 |
| 3 | | 3.83 | 0 | 0 | | 74.9 |
| 4 | 3 hours | 3.37 | 50 | 0 | FS-II | 78.3 |
| 5 | | 3.28 | 20 | 0 | (pH < 3.5) | 79.2 |
| 6 | | 3.36 | 0 | 0 | | 88.2 |
| 7 | 3 hours | 6.82 | 50 | 0 | FS-I | 5.3 |
| 8 | | 6.82 | 20 | 0 | | 4.1 |
| 9 | 3 hours | 6.82 | 25 | 5 | Mixed | 13.7 |
| 10 | | 6.82 | 20 | 5 | | 11.8 |
| 11 | 3 hours | 6.82 | 40 | 5 | Particu- | 9.4 |
| 12 | | 6.82 | 30 | 10 | late | 22.6 |

*Corrected solubility (in percent) based on native WPI = 100% soluble. Method adapted from Britten et al., Journal of Dairy Science 77 676 (1994).

Differential scanning calorimetry.

DSC was conducted to determine the percent denaturation and the shift in denaturation temperature (from native WPI) imposed by each gelation process. According to Table 3, no trends in denaturation temperature and salt concentratation were observed. Although increasing salt did have a stabilizing effect on the protein, decreasing the denaturation and resulting in a higher calculated % native protein. In the 3-hour gelation treatment, sample 4, made with 50 mM NaCl, had a native protein concentration of 10.49% while sample 5, made with 20 mM NaCl, had a 6.58% and sample 6, made with 0 mM NaCl, had a 4.69%. This trend was also noted by Harwalkar et al. (Milchwissenchaft 40, 31 (1985)), who documented higher ionic strength (Γ/2) values increased the rate of denaturation, but a protective effect from denaturation was noticed when Γ/2 was increased from 0 to 0.1. This response may be due to the increase in hydration usually exhibited by globular proteins around Γ/2 of 0.15 (S. Damodaran, in O. Fennema, *Food Chemistry* 321–430 (3d Ed. 1996)). The stability could arise from the withdrawl of hydrophobic groups of protein from water leading to a compact form. At lower ionic strength, the selective binding of chloride ions by the protein cationic sites may give rise to a more compressed form. The experimental NaCl concentrations in this research were all within the ionic strength range of 0 to 0.1, providing a protective effect and decreasing the denaturation with increasing salt.

TABLE 3

Percent native protein and temperature of denaturation as determined by DSC for protein gel powders exhibiting solubility of 70% or greater

| Sample ID | % Native Protein* | Denaturation Temp (C.) |
|---|---|---|
| Native | 100.00 | 76.94 |
| 3 | 26.21 | 87.67 |
| 4 | 10.49 | 86.69 |
| 5 | 6.58 | 86.05 |
| 6 | 4.69 | 88.29 |
| 7G | 42.04 | 87.55 |
| 7J | 41.01 | 87.16 |
| 7L | 44.80 | 87.16 | or 3.5 with varying NaCl concentrations were exampled (Gel not shown). Breakdown of molecular weights via densitometer measurements of proteins, protein fragments, and derivatives are presented in Table 4. Control banding patterns of WPI (lane 7) showed peaks corresponding to α-LA (14 kDa), β-LG (18 kDa), and a minor peak of BSA (66 kDa). The peak at 48 kDa in the native WPI may be due to hydrolysis of the larger molecular weight BSA or association of the smaller massed proteins, β-LG and α-LA not effected by the denaturant dithiothreitol (DTT). All peaks present in native WPI decreased with increased heating time at low pH values (<pH 3.5 and <pH 4.0), with new bands appearing between α-LA and β-LG while some migrating ahead of α-LA. Harwalkar (Id.) obtained similar electrophoretic patterns with a 2.0% TCA-insoluble fraction of heated whey. These results were attributed to structural alterations in α-LA, β-LG, or both due to low pH thermal treatments. In addition, Lupano (*Journal of Dairy Science* 77, 2191 (1994)) observed by SDS-PAGE many bands in the molecular mass range of 3.5 to 17 kDa after β-LG (0.5% in 0.02 M HCl; pH 2.5) was heated at 90° C. for 1 hr. The heat treatment in acidic conditions produce partial denaturation and cleavage of peptide bonds.

TABLE 4

Densitometer Values (in percent) of electrophoresis bands

| | Sample | Molecular Weight of Hydrolyzed/Polymerized Protein Fragments | | | | | | | | | |
|---|---|---|---|---|---|---|---|---|---|---|---|
| Lane* | ID | 82 kDa | 66 kDa | 58 kDa | 48 kDa | 36 kDa | 26 kDa | 18 kDa | 14 kDa | 7 kDa | 4 kDa |
| 2 | 3 | | 1.74 | 0.68 | | 4.77 | 1.30 | 58.82 | 31.66 | 1.03 | |
| 3 | 4 | | | | | | 0.53 | 66.00 | 31.81 | 1.67 | |
| 4 | 5 | | | 0.49 | | 2.60 | | 61.01 | 32.24 | 3.66 | |
| 5 | 6 | 0.44 | 1.05 | | 5.47 | 3.80 | 53.16 | | 30.56 | 4.52 | 1.00 |
| 6 | 6 | 0.22 | 0.76 | | 4.25 | 2.48 | 55.90 | | 29.30 | 4.95 | 2.14 |
| 7 | native | | 6.08 | | 3.17 | | | 58.66 | 32.09 | | |
| 8 | 7G | | 5.61 | 0.59 | 4.60 | | | 56.78 | 32.43 | | |
| 9 | 7J | | 3.53 | | 3.08 | | | 61.08 | 32.31 | | |
| 10 | 7L | | 2.66 | | 1.76 | | | 63.94 | 31.65 | | |

*Lane 1 was a MultiMark ™ molecular weight marker.

Another observation from DSC analysis was a decrease in percent native protein with an increased gelation time. The 45-minute gel powders had a native protein concentration of approximately 42% while the 3-hour treatment had concentrations that ranged from 26 to 2.5 % depending on pH and ionic strength. In addition, an upward shift (from native WPI) in denaturation temperature of the 45-minute and 3-hour gels was noted and may be attributed to the increased heat stability imparted by the reduced pH of the gelation conditions. DSC studies by de Wit et al. (*Journal of Daisy Science* 67, 2701 (1984)) showed greater thermal stability at pH 3.0 than at neutral pH evidenced by the increased transition temperature (e.g. denaturation temperature). In addition, Harwalkar (*Journal of Dairy Science* 63, 1043 (1980)) found, via optical rotation, denaturation of whey proteins at a solution pH of 2.5 was detectable only at 75° C. or above. At higher pH (e.g., at pH 7), initiation of thermal denaturation was detected at a much lower temperature, 65° C., exemplifying the thermal stability and higher transition temperatures noted in the proteins below pH 4.0.

Electrophoresis.

The electrophoretic patterns of SDS-PAGE of WPI heated (80° C. for 45 min and 3-hr) in HCl at pH values below 4.0

Further electrophoretic observations show a shift in fragment distribution between 26 and 18 kDa for sample 6. The shift in molecular weight may be attributed to deamidation of the Asn and Gln in β-LG due to the low pH thermal treatment. Harwalkar (*Journal of Dairy Science* 63, 1043 (1980)) found proteins thermally treated at pH 2.5 were unchanged in molecular size but altered in structure as determined by increased optical rotation measurements. This chemical alteration may have caused an increase in net charge of the β-LG and a structural change, altering the DTT binding and resulting in β-LG banding as a larger protein.

A low percentage of a high molecular mass band (82 kDa) was observed for sample 6, which may indicate the presence of aggregates, although DTT should have prevented this occurrence. While low pH inhibits disulfide interchange reactions, Darbre (1986) presented evidence for their presence at low pH values, although the process is not rapid. Thus, a certain degree of disulfide interchange reactions could be expected, mainly for the 3-hour thermal treatment samples. However this observation was not made for FS-II (<pH 3.5) gels containing NaCl, due to the stabilizing effect of salts.

Another possible explanation of the 82 kDa band for sample 6 is β-elimination of BSA. These reactions are usually carried out by heating the solution with K⁺, ⁻OH or Na⁺, and involve the loss of a proton at a β-carbon and the formation of an alkene (Fessenden et al., 1993). The result of β-elimination is the formation of pi bonds and therefore an alteration in structure. This structural modification may affect DTT binding and thus result in different banding patterns for those BSA proteins having under gone this elimination reaction.

In addition, trends in salt concentration and acid hydrolysis were noted from electrophoretic results. An increase in ionic strength of the protein powders for the 3-hour heating time had a stabilizing effect on the rate of acid hydrolysis, yielding fewer low molecular weight bands. Inorganic salts, such as NaCl, in low-ionic-strength aqueous solutions can increase the stability of folded conformations, in order to minimize the protein surface in contact with the solvent (Creighton, *Proteins: Structures and Molecular Properties* (2d ed. 1993)). It has also been found that salt bridges can form at low ionic strengths (<0.1M) which can increase the stability of the folded state because ionization and conformational stability are linked functions. The greater the stabilizing effect of a salt bridge, the less susceptible it is to disruption by extremes of pH (Id.). The enhanced stability of the folded protein conformation with increasing salt can decrease the interaction with the acidic environment, thereby decreasing the hydrolysis.

Rheological Analysis.

The following results were obtained for shear rate ramps, temperature ramps, pH stability studies and frequency sweep studies.

Shear Rate Ramps.

Figure 3:
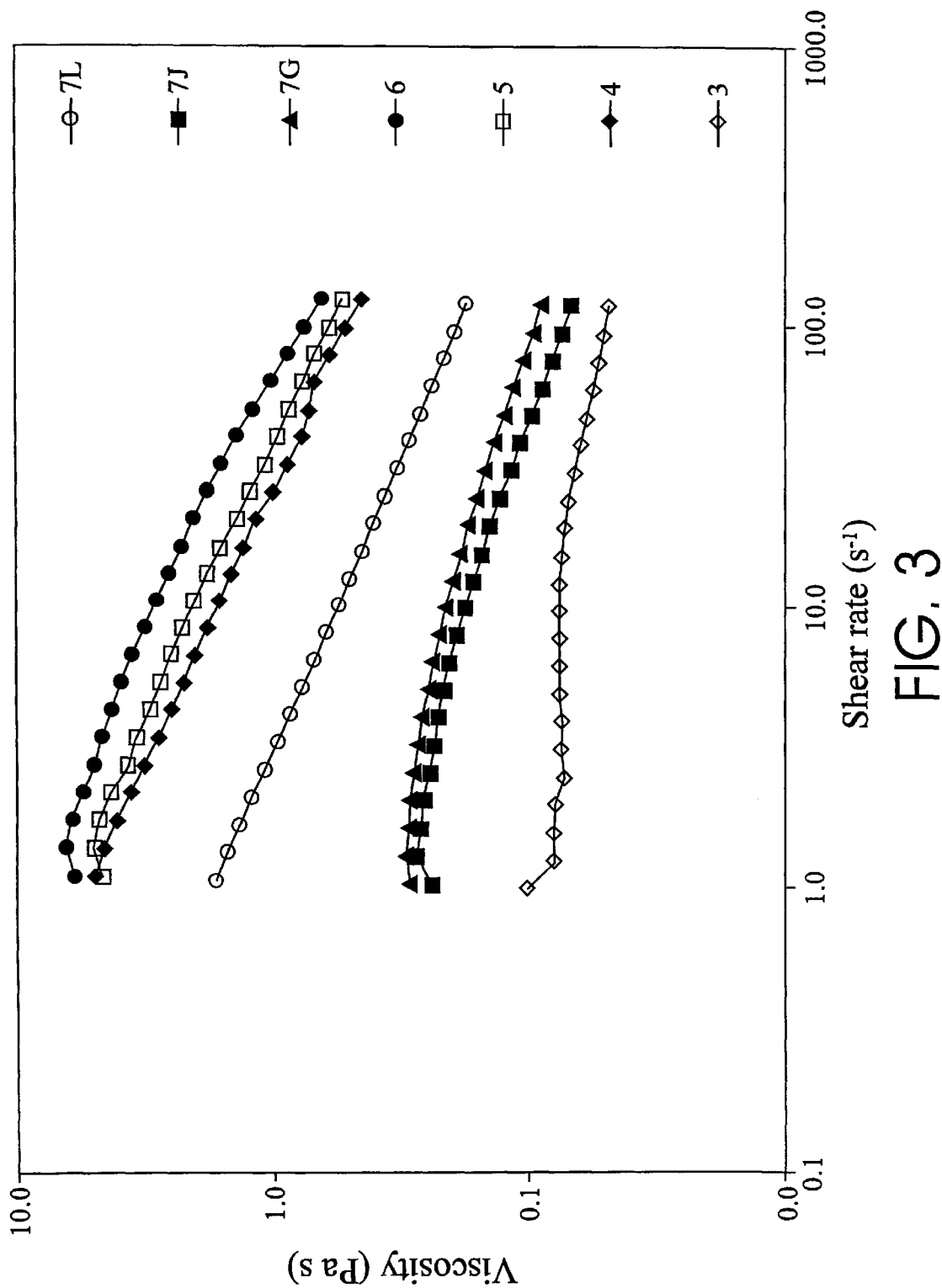
FIG. 3 shows the apparent viscosity of soluble gels under shear at 25° C.

Shear ramps were conducted to determine stability over the range of 0.9 to 116 s⁻¹ at 25° C. (FIG. 3). Sample 6 possessed the highest apparent viscosity over the selected test range. Therefore, based on solubility, electrophoretic patterns and apparent viscosity, sample 6 was selected as the best possibility for a thickener and marked for further study.

Figure 4:
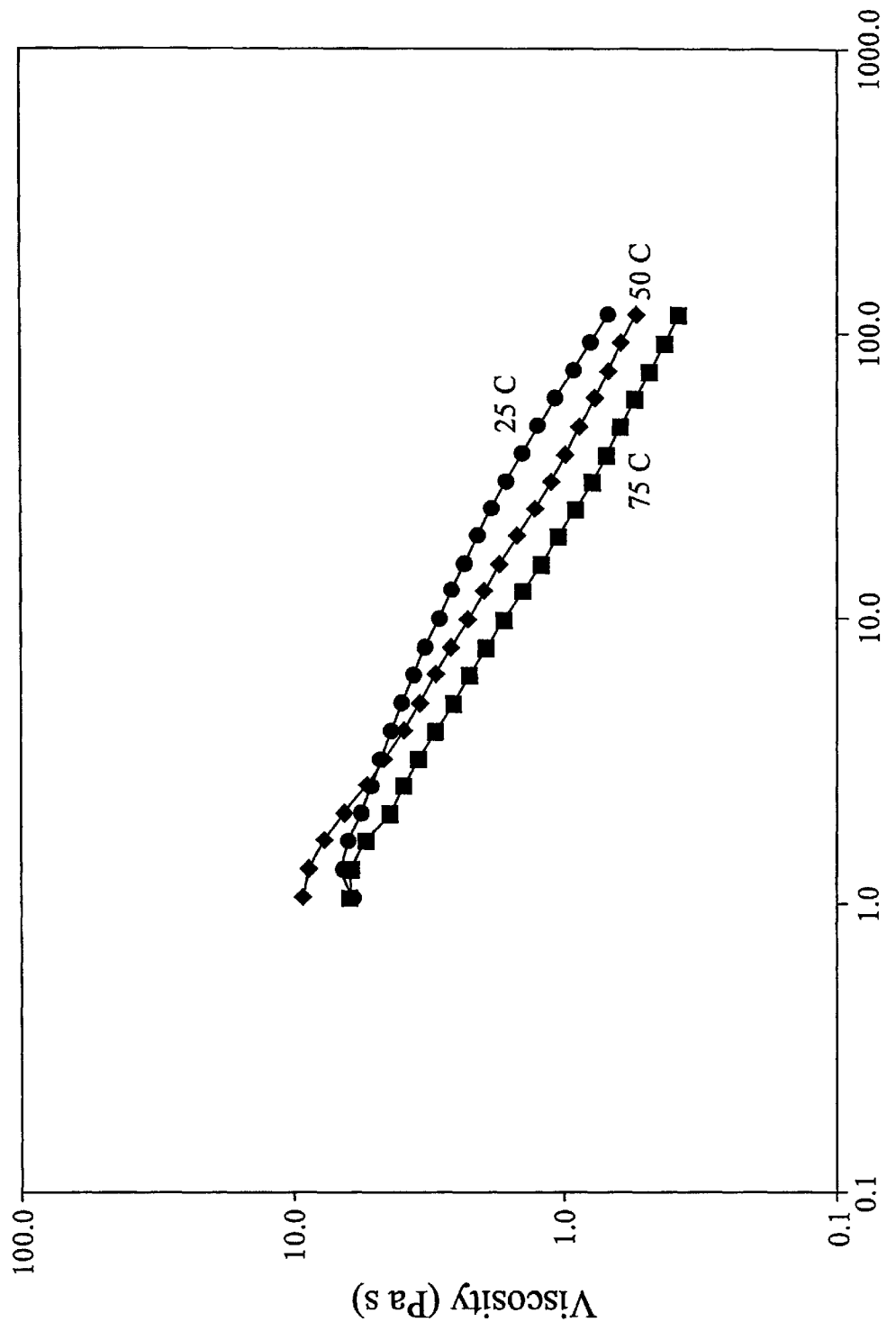
FIG. 4 shows the temperature effects of averaged apparent viscosity from shear ramps for sample 6 gels.

Further shear ramps were performed at 25, 50, and 75° C. to evaluate the influence of temperature on the apparent viscosity of sample 6 (FIG. 4). Sample 6 displayed little variation in apparent viscosity over the selected temperatures.

Temperature Ramps.

Figure 5:
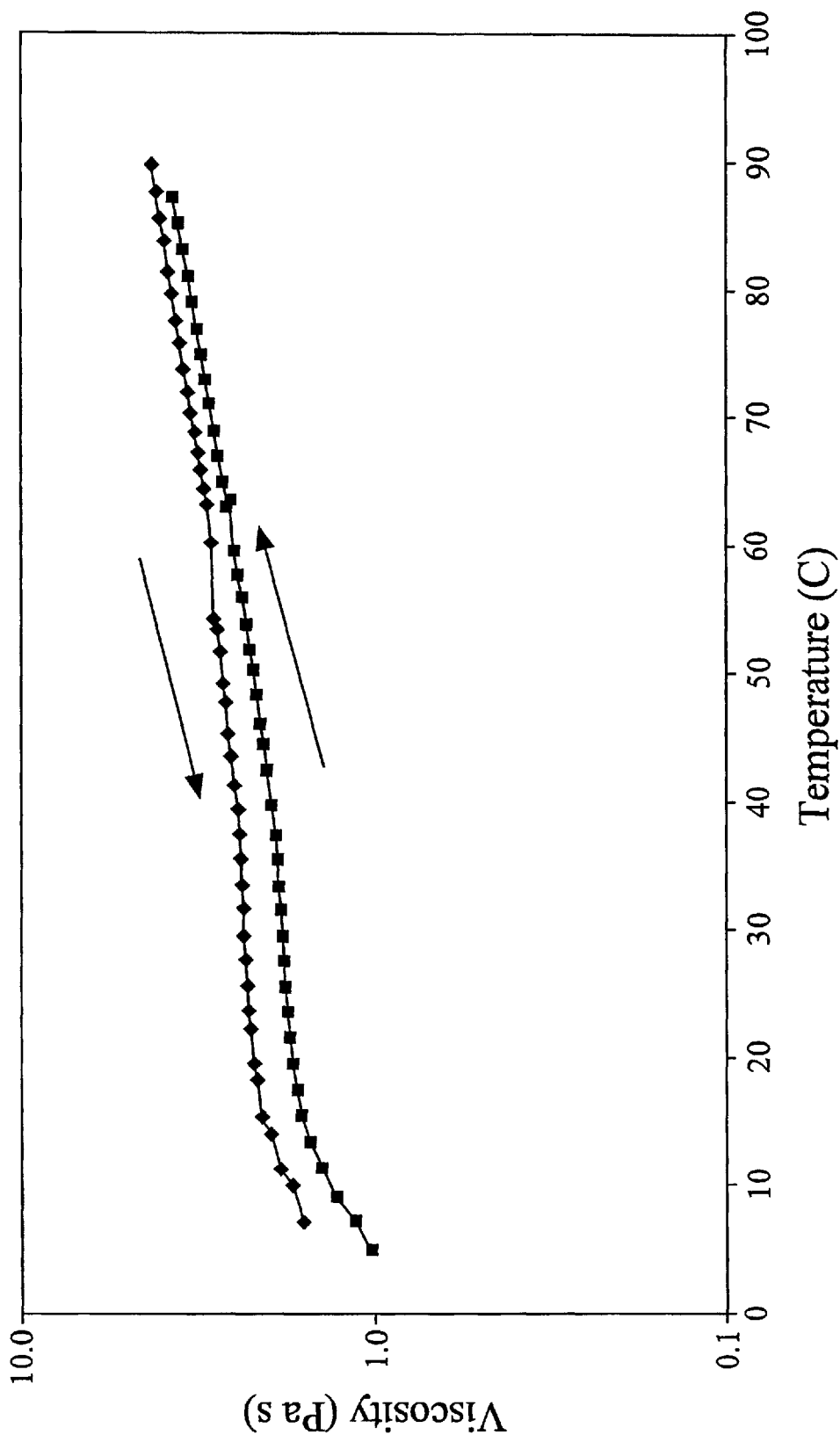
FIG. 5 shows the temperature ramp (5 to 90 and back to 5° C. for sample 6 at $46s^{-1}$.

Although a layer of paraffin oil was applied to the surface of the sample before temperature ramps were preformed, a moisture analysis was conducted before and after ramps to establish apparent viscosity differences were a characteristic of the material and not a consequence of drying. Only data on samples below 1% moisture difference before and after analysis were kept. In FIG. 5, sample 6 temperature ramps revealed little variation in the apparent viscosity from 10 to 55° C., however from 55 to 90° C. there is an increase of 1.3 Pa s. The increase in viscosity at the higher temperatures may be attributed to the additional denaturation of native or renatured protein structures. This theory is supported by the slightly higher viscosity recorded for the 90 to 5° C. temperature ramp. The higher apparent viscosity is due to protein unfolding and interaction, resulting in a larger hydrodynamic radius of the particles and hence increased viscosity.

pH stability.

Figure 6:
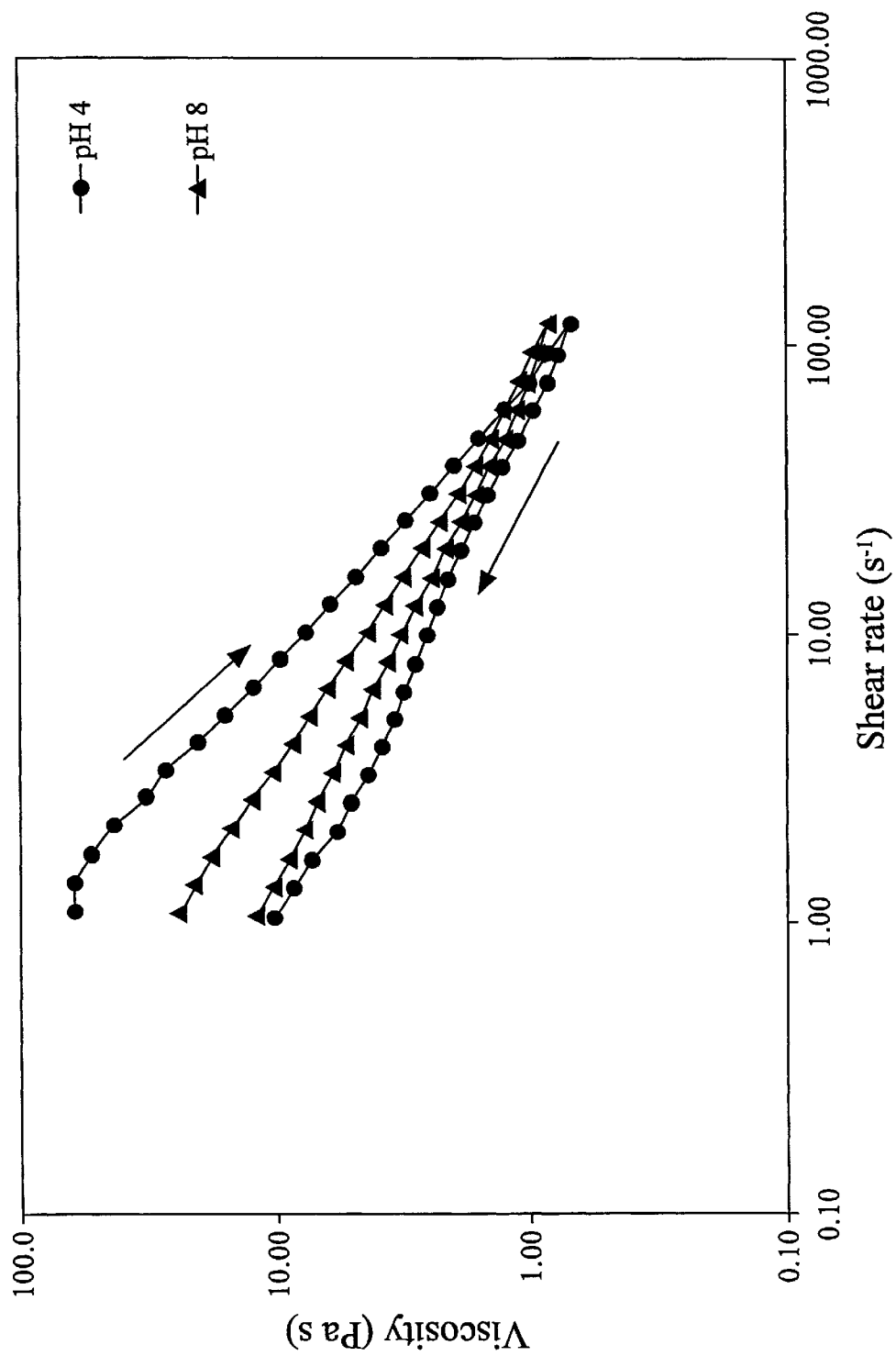
FIG. 6 shows the effects of pH on averaged apparent viscosity for sample 6.

Shear ramps were conducted on sample 6 at pH values of 4 and 8 to determine pH effects on apparent viscosity over the shear rates selected (FIG. 6). Sample 6 exhibited little variation in apparent viscosity over the pH values selected for the up curve of the shear ramp. However, on the initial ramp up, the solution at pH 4.0 had a substantially higher apparent viscosity than the sample at pH 8.0. This observation may be a result of increased interaction of the protein fragments at lower pH due to native protein unfolding.

Frequency Sweep.

Figure 7A:
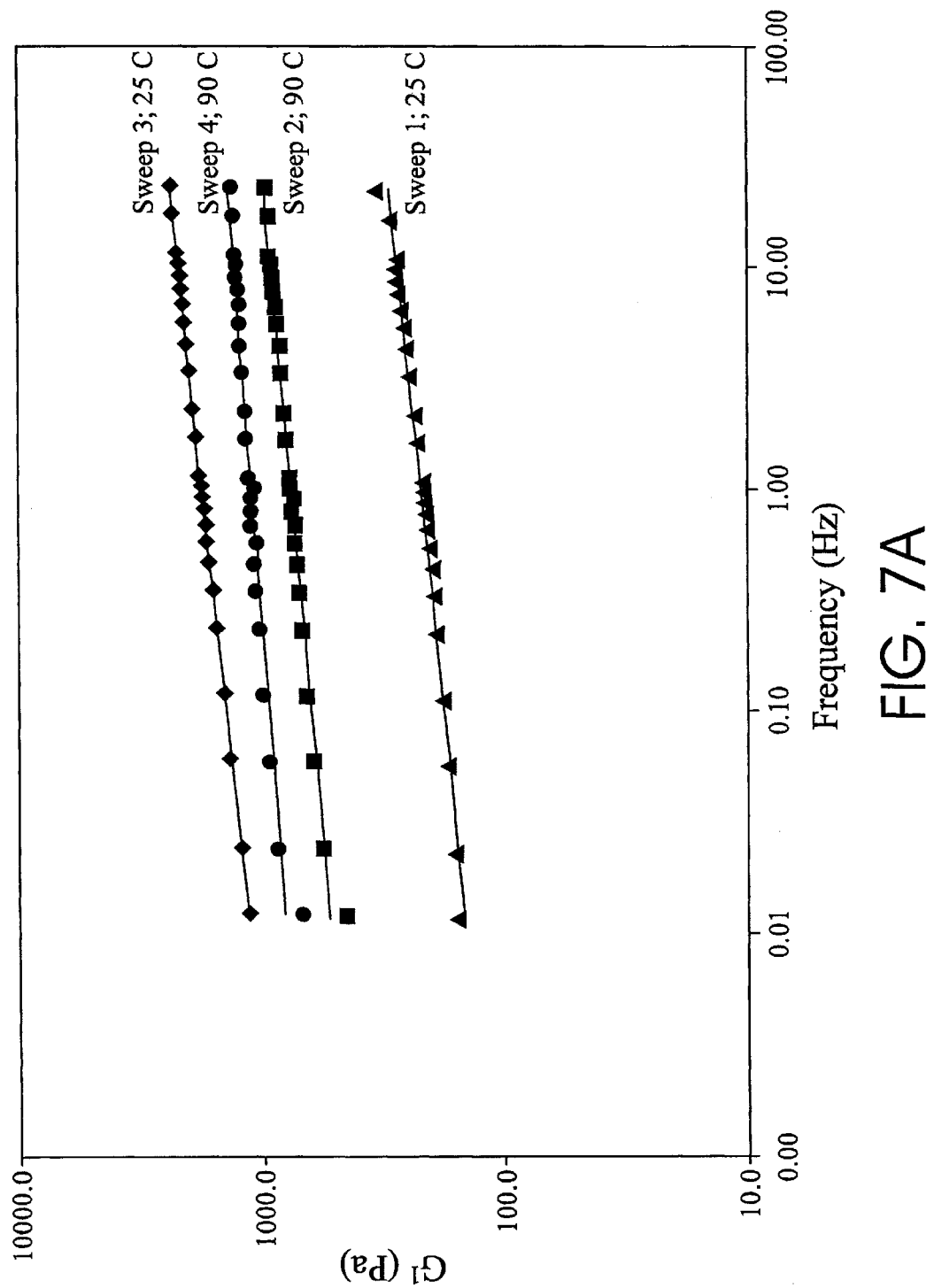
FIG. 7*a* shows a frequency sweep for sample 6.
Figure 7B:
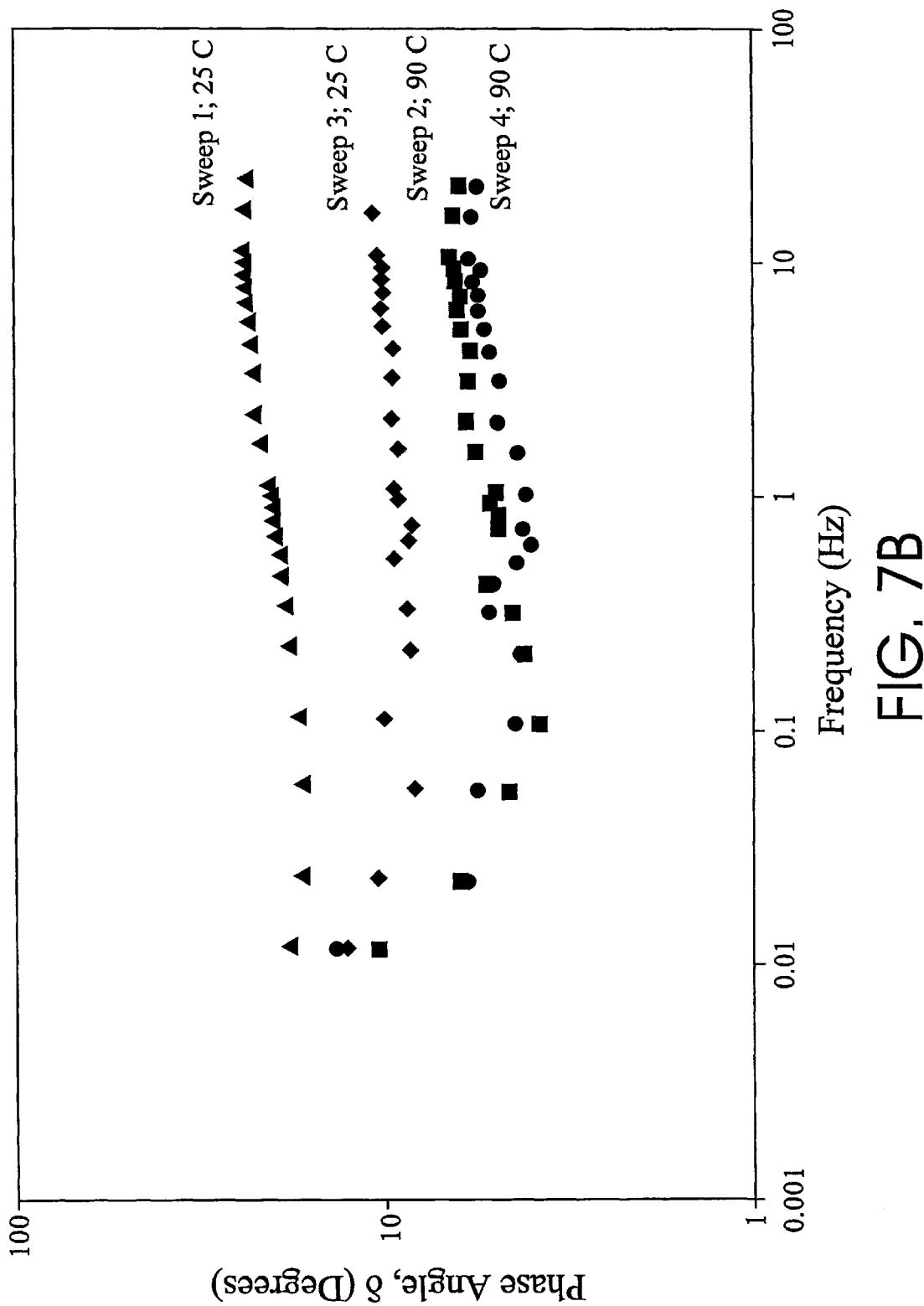
FIG. 7*b* shows a frequency sweep for sample 6.

Small amplitude oscillatory rheology was performed on sample 6 at temperatures of 25 and 90° C. to examine viscoelasticity. Although a layer of paraffin oil was applied to the surface of the sample before frequency sweeps were performed, a moisture analysis was conducted before and after to establish results were not a consequence of drying. Only data on samples, which possessed less than 1% moisture difference before and after analysis was used. Viscoelastic properties are typically described with three parameters, the phase angle (δ), the storage modulus (G'), and the loss modulus (G"). The moduli show distinct behaviors when subjected to a frequency sweep and can reveal general characteristics of the sample. As pictured in FIG. 7a, an increased frequency resulted in an increased G' value. The phase angle is equivalent to the $\tan^{-1}(G''/G')$ and ranges from 0 to 90°. The lower the phase angle, the more solid-like the material. According to FIG. 7b, for all sweeps the phase angle was below 25°, indicating the storage modulus dominated the loss modulus at every frequency. The coupling of the low phase angle and linearly increasing storage modulus is indicative of a weak gel network.

Four sweeps were performed on a single solution at temperatures alternating between 25 and 90° C. to elucidate temperature effects on gel network interactions. Comparing sweep 1 versus sweep 2 in FIGS. 7a and 7b, the storage modulus increased and the phase angle decreased at 90° C., explained by protein unfolding and increased hydrophobic interactions. As temperature was lowered for sweep 3, the newly unfolded proteins from sweep 2 were able to participate in network formation yielding a higher G'. Sweep 4 and sweep 2, each at 90° C. demonstrated similar rheological behavior, typical of diminished hydrogen bonding at elevated temperatures. Following the initial sweep at 90° C., subsequent sweeps produced comparable rheological results, supporting the claim of a temperature independent gel structure (see FIG. 4).

The foregoing is illustrative of the present invention, and is not to be construed as limiting thereof. The invention is defined by the following claims, with equivalents of the claims to be included therein.

We claim:

1. A dry protein product useful as a fat substitute or thickening agent, said product comprising:

a dry powder produced by hydrolyzing, gelling, drying and then powdering a whey protein;

said powder having a viscosity of at least about one-half pascal second at 46 reciprocal seconds for one half hour in a steady state shear test at 25° C. when reconstituted as a 10% weight/weight solution in deionized water at a pH of 4; and said powder having a phase angle of five to forty degrees at frequencies of from 0.01 to 20 Hertz in a frequency sweep test at 25° C. when reconstituted as a 10% weight/weight solution in deionized water.

2. A dry protein product according to claim 1, said powder having a viscosity of at least about one-half pascal second at 46 reciprocal seconds for one half hour in a steady state shear test at 25° C. when reconstituted as a 10% weight/weight solution in deionized water at a pH of 8; and said powder having a viscosity of at least about one-half pascal second at 46 reciprocal seconds for one half hour in a steady state shear test at 75° C. when reconstituted as a 10% weight/weight solution in deionized water at a pH of 4.

3. A dry protein product according to claim 1, said dry powder having a particle size of 1 to 100 µm.

4. A dry protein product according to claim 1, said dry powder having a phase angle less than 20 in said frequency sweep test.

5. A dry protein product according to claim 1, further comprising from about 1 to 90 percent by weight of pregelatinized starch.

6. A method of making a dry powdered protein product useful as a fat substitute or thickening agent, said method comprising the steps of:

hydrolyzing a whey protein preparation to produce a hydrolyzed whey protein preparation; then gelling said hydrolyzed whey protein preparation to form a whey protein gel; then drying said whey protein gel to produced a dried whey protein gel; and powdering said dried whey protein gel, wherein the resultant powder has a viscosity of at least about one-half pascal second at 46 reciprocal seconds for one half hour in a steady state shear test at 25° C. when reconstituted as a 10% weight/weight solution in deionized water at a pH of 4; and said powder has a phase angle of five to forty degrees at frequencies of from 0.01 to 20 Hertz in a frequency sweep test at 25° C. when reconstituted as a 10% weight/weight solution in deionized water.

7. A method according to claim 6, wherein said hydrolyzing step is an acid hydrolysis step.

8. A method according to claim 7, wherein said acid hydrolysis step is carried out with an acid selected from the group consisting of hydrochloric acid, sulfuric acid, citric acid, acetic acid, phosphoric acid, polyphosphoric acid, phytic acid, oxalic acid, succinic, maleic acid, fumaric acid, and lactic acid.

9. A method according to claim 6, wherein said hydrolyzing step is an enzyme hydrolysis step.

10. A method according to claim 6, wherein said gelling step comprises gelling said hydrolyzed whey protein concentrate to form a weak fine-stranded gel.

11. A method according to claim 6, wherein said gelling step is carried out at a pH of 4 or less.

12. A method according to claim 6, wherein said gelling step comprises gelling said hydrolyzed when protein concentrate to form an FS-II gel.

13. A method according to claim 6, wherein said drying step is carried out by dehydrating, freeze-drying, or spray drying.

14. A method according to claim 6, wherein said powdering step comprises powdering said dried whey protein gel into a powder having an average particle size of 1 to 100 µm.

15. A method of making a reduced fat formulated edible food product for human consumption, said method comprising the steps of:

providing a dry protein powder according to claim 1; and mixing said dry protein powder with the remaining ingredients for said edible food product, said dry protien powder included in an amount sufficient to make an organoleptic contribution to said food product, so that said dry protein powder is hydrated in said food product.

16. A method according to claim 15, wherein said food product is a frozen food product.

17. A method according to claim 15, wherein said food product is a refrigerated food product.

18. A method according to claim 15, wherein said food product is a cooked food product.

19. A method according to claim 15, wherein said food product is a foamed food product.

20. In a formulated edible food product for human consumption normally containing fat in a sufficient concentration to make an organoleptic contribution to said food product, the improvement comprising:

replacing at least a portion of said fat in the food product with a hydrated dry protein powder according to claim 1.

21. A formulated edible food product according to claim 20, wherein said product is a frozen food product.

22. A formulated edible food product according to claim 20, wherein said product is a refrigerated food product.

23. A formulated edible food product according to claim 20, wherein said product is a cooked food product.

24. A formulated edible food product according to claim 20, wherein said product is a foamed food product.

25. A method of making a thickened formulated edible food product for human consumption, said method comprising the steps of:

providing a dry protein powder according to claim 1; and mixing said dry protein powder with the remaining ingredients for said edible food product, said dry protein powder included in an amount sufficient to increase the viscosity of said food product, and so that said dry protein powder is hydrated in said food product.

26. A method according to claim 25, wherein said food product is a frozen food product.

27. A method according to claim 25, wherein said food product is a refrigerated food product.

28. A method according to claim 25, wherein said food product is a cooked food product.

29. A method according to claim 25, wherein said food product is a foamed food product.

30. In a formulated edible food product for human consumption the consistency of which is desired to be thickened, the improvement comprising:

including a hydrated dry protein powder according to claim 1 in said product in an amount sufficient to increase the viscosity of said product.

31. A formulated edible food product according to claim 30, wherein said product is a frozen food product.

32. A formulated edible food product according to claim 30, wherein said product is a refrigerated food product.

33. A formulated edible food product according to claim 30, wherein said product is a cooked food product.

34. A formulated edible food product according to claim 30, wherein said product is a foamed food product.

35. A method of making a formulated edible food product for human consumption having water bound therein, said method comprising the steps of:

providing a dry protein powder according to claim 1; and mixing said dry protein powder with the remaining ingredients for said edible food product, said dry protien powder included in an amount sufficient enhance the retention of water in said food product, and so that said dry protein powder is hydrated in said food product.

36. A method according to claim 35, wherein said food product is a frozen food product.

37. A method according to claim 35, wherein said food product is a refrigerated food product.

38. A method according to claim 35, wherein said food product is a cooked food product.

39. A method according to claim 35, wherein said food product is a foamed food product.

40. In a formulated edible food product normally containing a binder to retain water in said food product, the improvement comprising:

replacing at least a portion of said binder in the food product with a hydrated dry protein powder according to claim 1 in an amount sufficient to enhance the retention of water in said food product.

41. A formulated edible food product according to claim 40, wherein said product is a frozen food product.

42. A formulated edible food product according to claim 40, wherein said product is a refrigerated food product.

43. A formulated edible food product according to claim 40, wherein said product is a cooked food product.

44. A formulated edible food product according to claim 40, wherein said product is a foamed food product.

* * * * *